(12) United States Patent
Boraas et al.

(10) Patent No.: US 8,602,457 B2
(45) Date of Patent: Dec. 10, 2013

(54) QUICK CONNECT APPARATUS

(75) Inventors: Michael A. Boraas, Zumbrota, MN (US); Eric A. Eckberg, Rochester, MN (US); Scott A. Shurson, Mantorville, MN (US)

(73) Assignee: International Business Machines Corporation, Armonk, NY (US)

( * ) Notice: Subject to any disclaimer, the term of this patent is extended or adjusted under 35 U.S.C. 154(b) by 6 days.

(21) Appl. No.: 13/334,174

(22) Filed: Dec. 22, 2011

(65) Prior Publication Data
US 2013/0161945 A1 Jun. 27, 2013

(51) Int. Cl.
*F16L 37/18* (2006.01)
(52) U.S. Cl.
USPC .............. 285/314; 285/316; 29/237
(58) Field of Classification Search
USPC .............. 285/312, 314, 315, 316; 29/237
See application file for complete search history.

(56) References Cited

U.S. PATENT DOCUMENTS

| | | | | |
|---|---|---|---|---|
| 382,597 A * | 5/1888 | Emerson | ................... | 285/314 |
| 798,795 A * | 9/1905 | Itrich | ................... | 285/316 |
| 1,069,904 A * | 8/1913 | Sanders | ................... | 285/314 |
| 1,070,885 A * | 8/1913 | Gentile et al. | ................... | 285/315 |
| 1,369,304 A * | 2/1921 | Schram | ................... | 285/314 |
| 1,711,870 A * | 5/1929 | Zerk | ................... | 285/315 |
| 1,857,528 A * | 5/1932 | Cantell | ................... | 220/316 |
| 1,916,284 A * | 7/1933 | Ragan | ................... | 285/314 |
| 2,388,179 A * | 10/1945 | Prowd | ................... | 285/315 |
| 2,409,650 A * | 10/1946 | Wiggins | ................... | 285/316 |
| 2,425,500 A * | 8/1947 | Wiggins | ................... | 285/316 |
| 3,435,848 A * | 4/1969 | Johnston | ................... | 285/316 |
| 3,454,047 A * | 7/1969 | Johnston | ................... | 285/316 |
| 3,503,637 A * | 3/1970 | Sosaburo | ................... | 285/315 |
| 3,680,893 A * | 8/1972 | Giraud | ................... | 285/316 |
| 4,691,942 A | 9/1987 | Ford | | |
| 4,802,694 A | 2/1989 | Vargo | | |
| 5,305,984 A * | 4/1994 | Chen | ................... | 285/316 |
| 5,380,051 A * | 1/1995 | Breuhan | ................... | 285/316 |
| 5,628,531 A | 5/1997 | Rosenberg et al. | | |
| 5,896,889 A | 4/1999 | Menard | | |
| 6,062,606 A * | 5/2000 | Carpini et al. | ................... | 285/316 |
| 6,089,619 A | 7/2000 | Goda | | |
| 7,431,346 B2 * | 10/2008 | Frost et al. | ................... | 285/316 |
| 7,434,842 B2 | 10/2008 | Schmidt | | |
| 7,766,393 B2 * | 8/2010 | Tiberghien et al. | ........... | 285/316 |

* cited by examiner

*Primary Examiner* — David E Bochna
(74) *Attorney, Agent, or Firm* — H. Barrett Spraggins; Katherine S. Brown; Biggers Kennedy Lenart Spraggins LLP

(57) ABSTRACT

Quick connect apparatuses and methods of operating a quick connect apparatus are provided. Embodiments include a first tubular element to house a portion of a second tubular element inserted into the first tubular element; a quick connect coupling to lock the first tubular element to the second tubular element, the quick connect coupling including: a locking collar; a semicircular wedge; a rocker arm, the rocker arm to change a radial distance of the semicircular wedge relative to center of the first tubular element in response to a movement of the locking collar in a direction parallel to direction of insertion of the second tubular element into the first tubular element; a beveled washer surrounding the first tubular element; and a spring to apply a preload force to the beveled washer, the parallel movement of the beveled washer changing an amount of the preload force applied by the spring.

20 Claims, 3 Drawing Sheets

QUICK CONNECT APPARATUS

BACKGROUND OF THE INVENTION

1. Field of the Invention

The field of the invention is quick connect apparatuses and methods of operating a quick connect apparatus.

2. Description of Related Art

A number of types of quick connecting and disconnecting couplings have been devised. Such couplings are used for quickly interconnecting tubular elements, such as pipes, conduits, or hose sections for the purpose of establishing a fluid-tight coupling through which fluid may flow without leakage. When setting up a blind mate connection between the tubular elements, a preload force is used to join the tubular elements. After the connection is made, relieving the preload force may present design and operational concerns.

SUMMARY OF THE INVENTION

Quick connect apparatuses and methods of operating a quick connect apparatus are provided. Embodiments include a first tubular element to house a portion of a second tubular element inserted into the first tubular element; a quick connect coupling to lock the first tubular element to the second tubular element, the quick connect coupling including: a locking collar attached to and surrounding the second tubular element; a semicircular wedge surrounding the first tubular element; a rocker arm attached to the first tubular element and one end coupled to the semicircular wedge, the rocker arm to change a radial distance of the semicircular wedge relative to center of the first tubular element in response to a movement of the locking collar in a direction parallel to direction of insertion of the second tubular element into the first tubular element; a beveled washer surrounding the first tubular element, the beveled washer to move parallel to direction of insertion of the second tubular element into the first tubular element in response to the change in radial distance of the semicircular wedge to the center of the first tubular element; and a spring to apply a preload force to the beveled washer, the parallel movement of the beveled washer changing an amount of the preload force applied by the spring.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
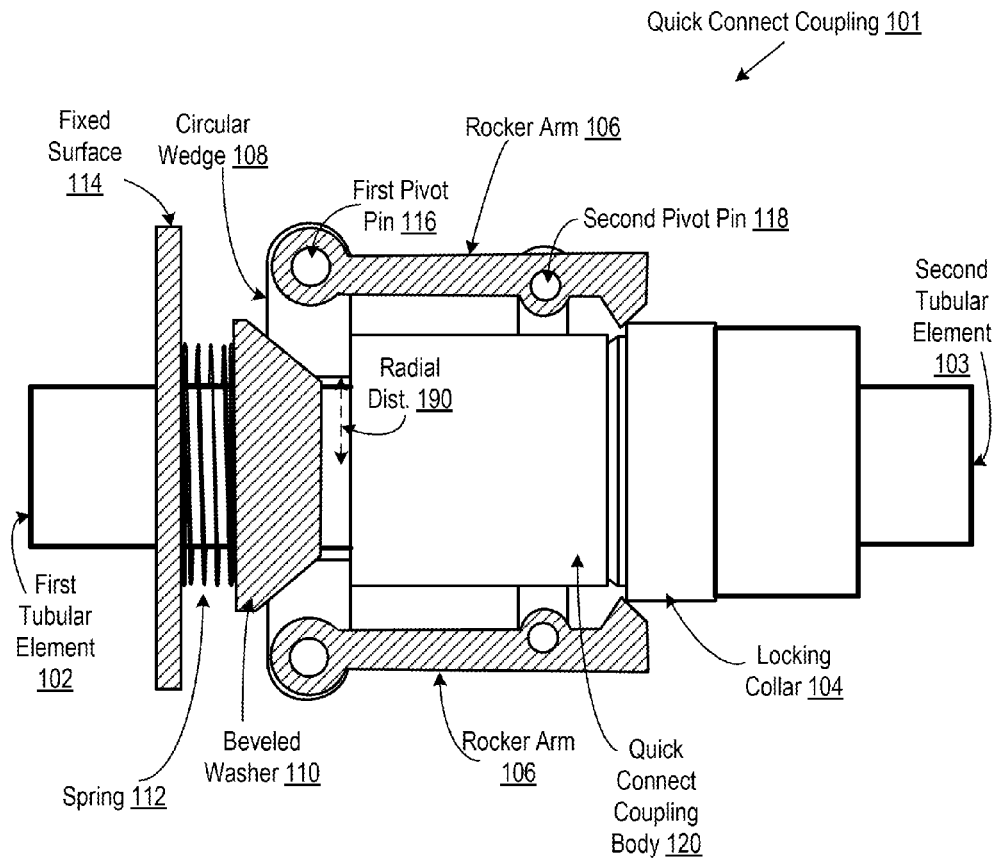
FIG. 1 sets forth a diagram of an exemplary quick connect apparatus in an unlocked state in accordance with embodiments of the present invention.

Exemplary quick connect apparatuses and methods of operating a quick connect apparatus in accordance with the present invention are described with reference to the accompanying drawings, beginning with FIG. 1. FIG. 1 sets forth a diagram of an exemplary quick connect apparatus in an unlocked state and FIG. 2 sets forth a diagram of an exemplary quick connect apparatus in a locked state. The quick connect apparatuses of FIGS. 1 and 2 include a first tubular element (102) and a second tubular element (103). Examples of tubular elements include fluid pipes, conduits, and hose sections. To connect the tubular elements, a quick connect coupling (101) is used.

The quick connect coupling (101) may include quick connect mechanisms (not shown) for creating a fluid-tight connection. For example, using a series of valves with shutoff components, elastic seals, and springs, the tubular elements may allow fluid to flow between the tubular elements by opening sets of valve seals when the tubular elements are connected together and shutting these valve seals when the tubular elements are disconnected. Once the second tubular element (104) is inserted into the first tubular element (102), the quick connect coupling (101) is also capable of locking the first tubular element (102) to the second tubular element (103). That is, the quick connect coupling (101) may operate in an unlocked state in which the first tubular element (102) is capable of separating from the second tubular element (103) or in a locked state in which the first tubular element (102) is locked to the second tubular element (103).

Figure 2:
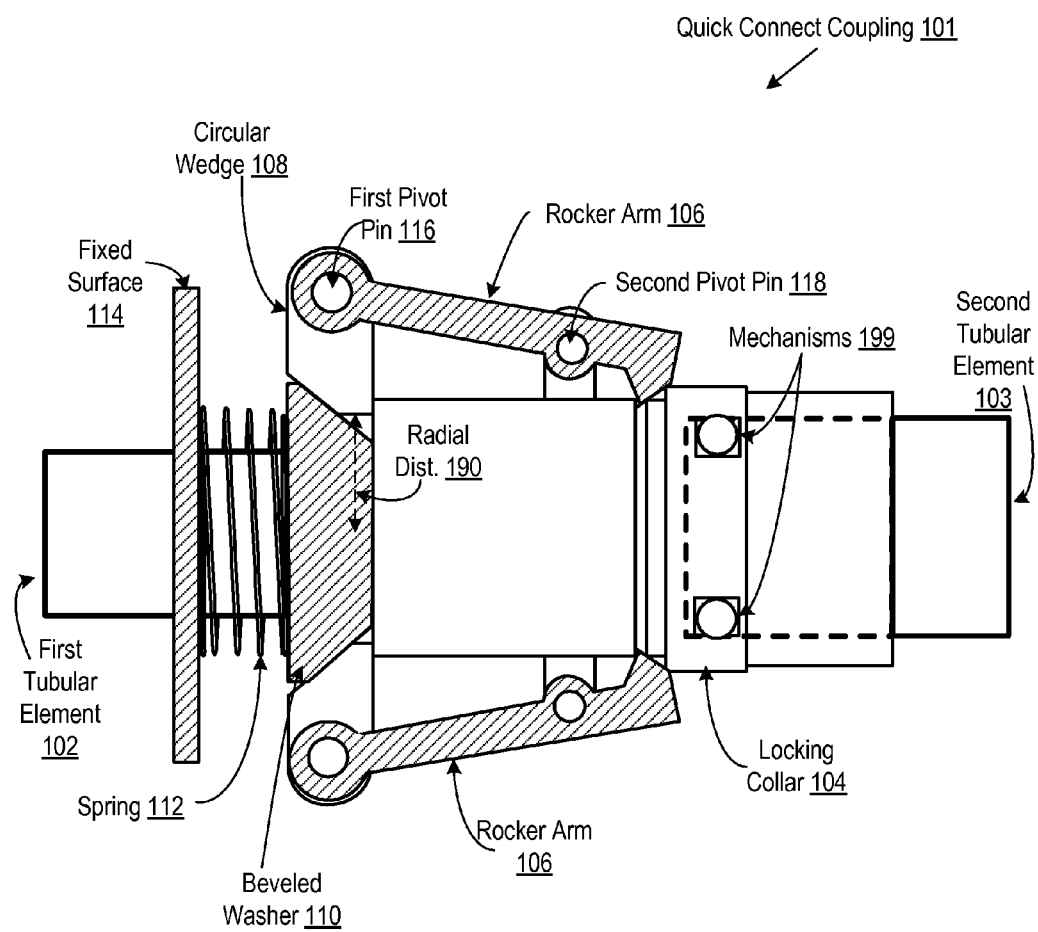
FIG. 2 sets forth a diagram of an exemplary quick connect apparatus in a locked state in accordance with embodiments of the present invention.

In the examples of FIGS. 1 and 2, the quick connect coupling (101) includes a quick connect coupling body (120) that acts as a housing for the interconnection of the first tubular element (102) and the second tubular element (103). In addition, the quick connect coupling (101) acts as a body to which other components of the quick connect coupling (101) may be fastened.

The quick connect coupling (101) also includes a locking collar (104) attached to and surrounding the second tubular element (103). The locking collar (104) is configured to slide parallel to the direction of insertion of the second tubular element (103) into the first tubular element (102).

The quick connect coupling (101) also includes a semicircular wedge (108) that surrounds the first tubular element (102) and at least one rocker arm (106) attached to the first tubular element (102). A semicircular wedge is a wedge that surrounds less than three hundred and sixty degrees of a tubular element. In the examples of FIGS. 1 and 2, the rocker arm (106) is configured to change a radial distance (190) of the semicircular wedge (108) relative to center of the first tubular element (102) in response to a movement of the locking collar (104) in a direction parallel to direction of insertion of the second tubular element (103) into the first tubular element (102). Each semicircular wedge (108) is coupled to each rocker arm (106) with first rocker arm pivot pins (116). The first pivot pin (116) provides a pivot point for a semicircular wedge to move relative to the rocker arm. A second pivot pin (118) fastens the rocker arm (106) to the quick connect coupling body (120) and provides a pivot point for the rocker arm (106) to move relative to the quick connect coupling body (120).

The quick connect coupling (101) also includes a beveled washer (110) surrounding the first tubular element (102). The beveled washer (110) moves parallel to the direction of insertion of the second tubular element (103) into the first tubular element (102) in response to the change in radial distance (190) of the semicircular wedge (108) to the center of the first tubular element (102).

The quick connect coupling (101) also includes a spring (112) to apply a preload force to the beveled washer (110). In the examples of FIGS. 1 and 2, the movement of the beveled washer (110) changes an amount of the preload force applied by the spring (112) as the spring (112) compresses or decompresses between a fixed surface (114) and the beveled washer (110).

The quick connect coupling (101) is capable of switching between a locked state and an unlocked state and vice-versa. In the locked state, the quick connect coupling (101) locks the first tubular element (102) to the second tubular element (103). In the unlocked state, the quick connect coupling (101) allows the first tubular element (102) to separate from the second tubular element (103).

In the example of FIG. 1, the quick connect coupling (101) is illustrated in the unlocked state and in the example of FIG. 2, the quick connect coupling is illustrated in the locked state. To change the quick connect coupling (101) from an unlocked state to a locked state, the locking collar (104) is slid away from the first tubular element (102) by mechanisms (199 of FIG. 2) within the tubular elements that respond to the insertion force that is used to couple the tubular elements. Sliding the locking collar (104) away from the first tubular element (102) results in the end of the rocker arm (106) coupled to the semicircular wedge (108), moving radially outward from the center of the first tubular element (102). The end of the rocker arm (106) coupled to the semicircular wedge (108), moving radially outward from the center of the first tubular element (102) results in the semicircular wedge (108) moving radially outward from the center of the first tubular element (102). For example, the radial distance (190) of the semicircular wedge (108) of FIG. 1 is less than the radial distance (19)0 of the semicircular wedge (108) of FIG. 2. The semicircular wedge (108) moving radially outward from the center of the first tubular element (102) results in the beveled washer (110) moving toward the second tubular element (103). Movement of the beveled washer (110) toward the second tubular element (103), decompresses the spring (112). That is, as the quick connect coupling (101) is moved from the unlocked state to the locked state, the spring (112) decompresses, thus reducing the force between the quick connect coupling (101) and the first tubular element (102). For example, the spring (112) is more compressed in FIG. 1 than in FIG. 2.

In the example of FIG. 1, to change the quick connect coupling (101) from the unlocked state to the locked state, the locking collar (104) is slid toward the first tubular element (102) by mechanisms within the tubular elements that respond to the insertion force that is used to couple the tubular elements. Sliding the locking collar (104) toward the first tubular element (102) results in the end of the rocker arm (106) coupled to the semicircular wedge (108), moving radially toward the center of the first tubular element (102). The end of the rocker arm (106) coupled to the semicircular wedge (108), moving radially toward the center of the first tubular element (102) results in the semicircular wedge (108) moving radially toward from the center of the first tubular element (102). The semicircular wedge (108) moving radially toward the center of the first tubular element (102) results in the beveled washer (110) moving away from the second tubular element (103). Movement of the beveled washer (110) away from the second tubular element (103), compresses the spring (112). That is, as the quick connect coupling (101) is moved from the locked state to the unlocked state, the spring (112) compresses, thus increasing the force between the quick connect coupling (101) and the first tubular element (102).

Figure 3:
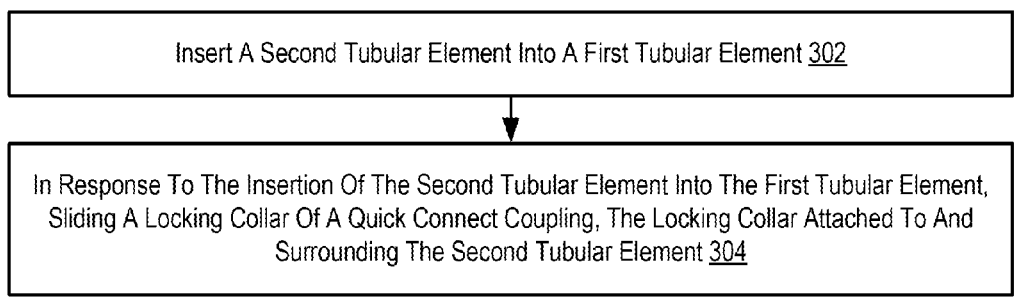
FIG. 3 sets forth a flow chart illustrating an exemplary method of operating a quick connect apparatus according to embodiments of the present invention.

For further explanation, FIG. 3 sets forth a flow chart illustrating an exemplary method for operating a quick connect apparatus according to embodiments of the present invention. For ease of explanation, the exemplary quick connect apparatuses of FIGS. 1 and 2 are used in the description of the method of FIG. 3. The method of FIG. 3 includes inserting (302) a second tubular element (103) into a first tubular element (102). Inserting (302) a second tubular element (103) into a first tubular element (102) may be carried out by pressing each tubular element into the quick connect coupling (101) so that fluid may flow between the first tubular element (102) and the second tubular element (103).

The method of FIG. 3 also includes in response to the inserting of the second tubular element (103) into the first tubular element (102), sliding (304) a locking collar (104) of the quick connect coupling (102). Sliding the locking collar (104) of the quick connect coupling (101) in response to the inserting of the second tubular element (103) into the first tubular element (102) may be carried out by mechanisms, such as ball bearings, within the tubular elements that move the locking collar (104) in a direction parallel to the direction of insertion of the second tubular element (103) into the first tubular element (102) in response to the force of inserting the second tubular element into the first tubular element.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A quick connect apparatus, the apparatus comprising:
   a first tubular element to house a portion of a second tubular element inserted into the first tubular element;
   a quick connect coupling to lock the first tubular element to the second tubular element, the quick connect coupling including:
   a locking collar attached to and surrounding the second tubular element;
   a semicircular wedge surrounding the first tubular element;
   a rocker arm attached to the first tubular element and one end coupled to the semicircular wedge, the rocker arm to change a radial distance of the semicircular wedge relative to a center of the first tubular element in response to a movement of the locking collar in a direction parallel to a direction of insertion of the second tubular element into the first tubular element;
   a beveled washer surrounding the first tubular element, the beveled washer to move parallel to the direction of insertion of the second tubular element into the first tubular element in response to the change in radial distance of the semicircular wedge to the center of the first tubular element; and
   a spring to apply a preload force to the beveled washer, the parallel movement of the beveled washer changing an amount of the preload force applied by the spring.

2. The quick connect apparatus of claim 1, wherein the semicircular wedge is coupled to the rocker arm with rocker arm pivot pins, the rocker arm pivot pins providing a pivot point for the semicircular wedge to move relative to the rocker arm.

3. The quick connect apparatus of claim 1 wherein the quick connect coupling locks the first tubular element to the second tubular element when the quick connect coupling is in a locked state;
   wherein to change the quick connect coupling from an unlocked state to a locked state, the locking collar is slid away from the first tubular element.

4. The quick connect apparatus of claim 3 wherein sliding the locking collar away from the first tubular element results in the end of the rocker arm coupled to the semicircular wedge, moving radially outward from the center of the first tubular element.

5. The quick connect apparatus of claim 4 wherein the end of the rocker arm coupled to the semicircular wedge moving radially outward from the center of the first tubular element results in the semicircular wedge moving radially outward from the center of the first tubular element.

6. The quick connect apparatus of claim 5 wherein the semicircular wedge moving radially outward from the center of the first tubular element results in the beveled washer moving toward the second tubular element.

7. The quick connect apparatus of claim 6 wherein movement of the beveled washer toward the second tubular element, decompresses the spring.

8. The quick connect apparatus of claim 1 wherein the quick connect coupling locks the first tubular element to the second tubular element when the quick connect coupling is in a locked state;
wherein to change the quick connect coupling from a locked state to an unlocked state, the locking collar is slid toward the first tubular element.

9. The quick connect apparatus of claim 8 wherein sliding the locking collar toward the first tubular element results in the end of the rocker arm coupled to the semicircular wedge, moving radially toward the center of the first tubular element.

10. The quick connect apparatus of claim 9 wherein the end of the rocker arm coupled to the semicircular wedge, moving radially toward the center of the first tubular element results in the semicircular wedge moving radially toward from the center of the first tubular element.

11. The quick connect apparatus of claim 10 wherein the semicircular wedge moving radially toward the center of the first tubular element results in the beveled washer moving away from the second tubular element.

12. The quick connect apparatus of claim 11 wherein movement of the beveled washer away from the second tubular element, compresses the spring.

13. A method of operating a quick connect assembly, the quick connect assembly including a first tubular element, a second tubular element and a quick connect coupling to lock the first tubular element to the second tubular element, the method comprising:
inserting a second tubular element into a first tubular element; and
sliding a locking collar of the quick connect coupling, the locking collar attached to and surrounding the second tubular element, the quick connect coupling further comprising:
a semicircular wedge surrounding the first tubular element;
a rocker arm attached to the first tubular element and one end coupled to the semicircular wedge, the rocker arm to change a radial distance of the semicircular wedge relative to a center of the first tubular element in response to a movement of the locking collar in a direction parallel to a direction of insertion of the second tubular element into the first tubular element;
a beveled washer surrounding the first tubular element, the beveled washer to move parallel to the direction of insertion of the second tubular element into the first tubular element in response to the change in radial distance of the semicircular wedge to the center of the first tubular element; and
a spring to apply a preload force to the beveled washer, the parallel movement of the beveled washer changing an amount of the preload force applied by the spring.

14. The method of claim 13 wherein the quick connect coupling locks the first tubular element to the second tubular element when the quick connect coupling is in a locked state;
wherein sliding the locking collar away from the first tubular element changes the quick connect coupling from an unlocked state to the locked state.

15. The method of claim 14 wherein sliding the locking collar away from the first tubular element results in the end of the rocker arm coupled to the semicircular wedge, moving radially outward from the center of the first tubular element; and wherein the end of the rocker arm coupled to the semicircular wedge, moving radially outward from the center of the first tubular element results in the semicircular wedge moving radially outward from the center of the first tubular element.

16. The method of claim 15 wherein the semicircular wedge moving radially outward from the center of the first tubular element results in the beveled washer moving toward the second tubular element; wherein movement of the beveled washer toward the second tubular element, decompresses the spring.

17. The method of claim 13 wherein the quick connect coupling locks the first tubular element to the second tubular element when the quick connect coupling is in a locked state;
wherein sliding the locking collar toward the first tubular element changes the quick connect coupling from the locked state to an unlocked state.

18. The method of claim 17 wherein sliding the locking collar toward the first tubular element results in the end of the rocker arm coupled to the semicircular wedge moving radially toward the center of the first tubular element; wherein the end of the rocker arm coupled to the semicircular wedge moving radially toward the center of the first tubular element results in the semicircular wedge moving radially toward from the center of the first tubular element.

19. The method of claim 18 wherein the semicircular wedge moving radially toward the center of the first tubular element results in the beveled washer moving away from the second tubular element; and wherein movement of the beveled washer away from the second tubular element, compresses the spring.

20. The method of claim 13, wherein the semicircular wedge is coupled to the rocker arm with rocker arm pivot pins, the rocker arm pivot pins providing a pivot point for the semicircular wedge to move relative to the rocker arm.

* * * * *